United States Patent
Bouyssou et al.

(10) Patent No.: US 9,472,970 B2
(45) Date of Patent: Oct. 18, 2016

(54) BATTERY LIFE TIME MANAGEMENT

(71) Applicant: STMicroelectronics (Tours) SAS, Tours (FR)

(72) Inventors: Emilien Bouyssou, Luynes (FR); Igor Bimbaud, Mettray (FR)

(73) Assignee: STMICROELECTRONICS (TOURS) SAS, Tours (FR)

( * ) Notice: Subject to any disclaimer, the term of this patent is extended or adjusted under 35 U.S.C. 154(b) by 176 days.

(21) Appl. No.: 14/222,056

(22) Filed: Mar. 21, 2014

(65) Prior Publication Data

US 2014/0361747 A1    Dec. 11, 2014

(30) Foreign Application Priority Data

Jun. 6, 2013  (FR) .................................... 13 55209
Jun. 6, 2013  (FR) .................................... 13 55211

(51) Int. Cl.
*H02J 7/00*       (2006.01)
*H01M 10/052*     (2010.01)
*H01M 10/42*      (2006.01)
*H01M 6/50*       (2006.01)
*H01M 16/00*      (2006.01)
*H01M 10/44*      (2006.01)
*H01M 10/04*      (2006.01)
*H01M 10/0562*    (2010.01)
*H01M 6/40*       (2006.01)

(52) U.S. Cl.
CPC .......... *H02J 7/0075* (2013.01); *H01M 6/5077* (2013.01); *H01M 10/052* (2013.01); *H01M 10/4242* (2013.01); *H01M 10/44* (2013.01); *H01M 16/00* (2013.01); *H01M 6/40* (2013.01); *H01M 10/0436* (2013.01); *H01M 10/0562* (2013.01); *H01M 10/443* (2013.01); *Y02E 60/122* (2013.01)

(58) Field of Classification Search
CPC .... H02J 7/0091; H02J 7/0065; H02J 7/0068; H02J 7/0031; H01M 10/486; H01M 10/5004
USPC ..................................................... 320/136, 128
See application file for complete search history.

(56) References Cited

U.S. PATENT DOCUMENTS 3,709,206 A  *  1/1973  Myers ..................... F02P 3/051
                                                   123/641
4,054,826 A  *  10/1977 Wahlstrom ............. G04G 19/02
                                                   310/308
5,459,671 A     10/1995 Duley (Continued)

FOREIGN PATENT DOCUMENTS

DE   102010051613 A1   7/2011
EP   2310502           4/2011

(Continued)

OTHER PUBLICATIONS

French Search Report received in Application No. 1355209, mailed Mar. 12, 2014, 8 pages.

*Primary Examiner* — M'Baye Diao
(74) *Attorney, Agent, or Firm* — Slater Matsil, LLP

(57) ABSTRACT

A method for managing the lifetime of a battery is disclosed herein. An ambient temperature is measured near a battery. A discharge of the battery is triggered when the ambient temperature exceeds a first temperature threshold. The battery can then be charged when the ambient temperature decreases below a second temperature threshold.

26 Claims, 5 Drawing Sheets

(56) References Cited

U.S. PATENT DOCUMENTS

| | | | |
|---|---|---|---|
| 5,705,293 A | 1/1998 | Hobson | |
| 5,939,864 A | 8/1999 | Lenhart et al. | |
| 6,027,076 A | 2/2000 | Krause | |
| 6,072,299 A * | 6/2000 | Kurle | A61N 1/3975 320/112 |
| 7,157,883 B2 * | 1/2007 | Johnson | B25F 5/02 320/150 |
| 7,253,588 B2 * | 8/2007 | Satoh | H02J 7/0031 320/136 |
| 7,589,491 B2 | 9/2009 | Brecht | |
| 8,047,316 B2 | 11/2011 | Takami et al. | |
| 8,120,328 B2 * | 2/2012 | Eto | H01M 10/443 320/150 |
| 8,278,876 B2 * | 10/2012 | Bucur | H01M 2/1016 320/112 |
| 8,610,405 B2 * | 12/2013 | Yamazaki | H02J 7/0052 320/134 |
| 2005/0064278 A1 | 3/2005 | Fetcenko et al. | |
| 2007/0139847 A1 * | 6/2007 | Liu | B25F 5/00 361/115 |
| 2007/0184345 A1 | 8/2007 | Neudecker et al. | |
| 2007/0298316 A1 * | 12/2007 | Yamamoto | H01M 10/425 429/62 |
| 2008/0024089 A1 * | 1/2008 | Meng | H02J 7/0091 320/128 |
| 2010/0085010 A1 * | 4/2010 | Suzuki | B25F 5/00 320/132 |
| 2010/0123434 A1 * | 5/2010 | Iwata | H02J 7/0016 320/118 |
| 2010/0250162 A1 | 9/2010 | White et al. | |
| 2012/0074898 A1 * | 3/2012 | Schwartz | H02J 7/0016 320/107 |
| 2012/0256752 A1 | 10/2012 | Musser et al. | |
| 2014/0210415 A1 * | 7/2014 | Ohmori | H01M 10/44 320/118 |

FOREIGN PATENT DOCUMENTS

| | | |
|---|---|---|
| WO | 2007048366 A1 | 5/2007 |
| WO | 2009158364 A1 | 12/2009 |
| WO | 2013036234 A1 | 3/2013 |
| WO | 2013126742 A1 | 8/2013 |

\* cited by examiner

BATTERY LIFE TIME MANAGEMENT

This application claims the priority benefit of French Patent Application number 13/55209, filed on Jun. 6, 2013, and French Patent Application number 13/55211, filed on Jun. 6, 2013, the contents of which is hereby incorporated by reference in its entirety to the maximum extent allowable by law.

TECHNICAL FIELD

The present invention relates generally to electronic systems and methods, and, in particular embodiments, to battery life time management.

BACKGROUND

Documents U.S. Pat. No. 5,705,293, U.S. Publication No. 2007/0184345, and European Application No. EP2310502 describe examples of microbatteries.

Many types of microbatteries, used in self-contained fashion (for example, in the form of button cells) or directly implanted on printed circuits, are known. Certain microbatteries are rechargeable.

Documents U.S. Pat. Nos. 6,027,076 and 8,047,316 describe methods and systems for managing Li-Ion batteries to increase their lifetime.

SUMMARY OF THE INVENTION

Embodiments of the present invention relate to a method and a device for regenerating the charge capacity of a battery. Embodiments also relate to a so-called solid-state battery.

An embodiment provides a method for regenerating the charge capacity of a microbattery which overcomes all or part of the disadvantages of prior art.

Another embodiment, according to a first aspect, regenerates the charge capacity of a microbattery.

Another embodiment, according to a second aspect, improves the lifetime of a microbattery.

A method for managing the lifetime of a battery is provided, wherein a discharge of the battery is triggered when the ambient temperature exceeds a first threshold.

The foregoing and other features and advantages will be discussed in detail in the following non-limiting description of specific embodiments in connection with the accompanying drawings.

DETAILED DESCRIPTION OF ILLUSTRATIVE EMBODIMENTS

Figure 1:
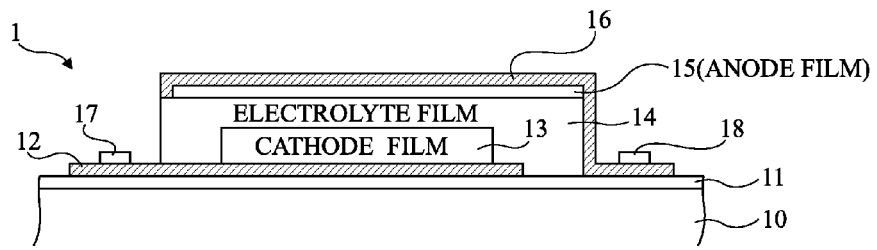
FIG. 1 very schematically shows an example of usual microbattery, of so-called all-solid-state thin-film lithium type.

The same elements have been designated with the same reference numerals in the different drawings, which have been drawn out of scale. For clarity, only those steps and elements which are useful to the understanding of the described embodiments have been detailed. In particular, the specific structure of a circuit for controlling the charge or discharge of a battery and of its secondary data storage circuits has not been detailed, the described embodiments being compatible with the use of current electronic systems, for example, based on a microcontroller.

A method for managing the lifetime of a battery is disclosed herein. For example, a discharge of the battery is triggered when the ambient temperature exceeds a first threshold.

According to an embodiment, a step of charge of the battery is carried out when the ambient temperature decreases below a second threshold.

According to an embodiment, the discharge of the battery is performed until a third threshold is reached.

According to an embodiment, the third threshold corresponds to less than 20%, preferably on the order of 5%, of the nominal charge of the battery when new.

According to an embodiment, the discharge step is followed by a battery step of biasing of the battery by applying there across a bias voltage lower than the minimum threshold voltage necessary to charge the battery.

According to an embodiment, the voltage is selected to correspond to from 30% to 50% of the voltage necessary to charge the battery.

According to an embodiment, the battery is of all-solid-state thin-film lithium type.

According to an embodiment, the first threshold is approximately 47° C.

According to an embodiment, the second threshold is approximately 65° C.

According to an embodiment, a device of the type converting power by thermoelectric effect replaces the battery during at least part of the discharge step.

According to an embodiment, the power converter is a Seebeck-effect power converter.

According to an embodiment, at least one threshold and/or the bias voltage is programmable.

According to an embodiment, a device for managing the lifetime of a battery in operation in a system is provided.

The above-described embodiments refer to the case of microbatteries formed in a thin film based on materials comprising lithium. They however apply to any type of batteries having an aging process following a similar pattern. In the present disclosure, terms microbattery and battery are equivalently used.

The ambient temperature, the charge and discharge state significantly influence the variation of the battery charge capacity. Further, the charge capacity performances of microbatteries depend on the environmental conditions, on the storage conditions, and on the operating conditions.

It would be desirable to lengthen the lifetime of a microbattery by placing it in optimal conditions of use, enabling to maintain a significant charge capacity all along the battery service life and lifetime.

It would also be desirable to be able to predict the aging of a microbattery according to its utilization mode and to be able to detect and to report the fact that its charge capacity becomes insufficient.

An embodiment of the present disclosure provides a discharge of the battery according to certain conditions of use or of storage and/or according to parameters such as temperature.

FIG. 1 is a simplified cross-section view of a usual microbattery 1 of so-called all-solid-state thin-film lithium type. The battery is formed on a substrate 10, in certain cases covered with an insulating layer 11, for example, made of silicon oxide. A cathode current collector layer 12, for example, made of platinum, is deposited on insulating layer 11. Above cathode current collector 12 is arranged a positive electrode layer 13 (CATHODE FILM), for example, made of lithiated cobalt oxide. An electrolyte 14 (ELECTROLYTE FILM) is deposited on layer 13. It may for example be formed of a compound of lithium and phosphorus oxynitride (LiPON).

Above electrolyte 14 extends a negative electrode layer 15 (ANODE FILM), which may be formed, for example, of metal lithium, of silicon, or of germanium. Layer 15 is topped with an anode current collector layer 16, for example, made of copper. In certain cases, for example, so-called high-temperature batteries, cathode and anode current collector layers 12 and 16 are locally topped, respectively, with a cathode contact pad 17 and with an anode contact pad 18. In the example of FIG. 1, layer 16 extends on one side of the structure to reach layer 11 and extend thereon. The structure thus formed is covered with a passivation layer, not shown. Typically, such a battery has a thickness of a few microns or tens of microns and a surface area on the order of one cm2.

European patent Application No. EP2301502 describes an example of battery of lithium-ion type as well as its manufacturing principle.

During the charge of this type of battery, lithium ions displace from the positive electrode to negative electrode 15, while during the discharge, lithium ions displace in the reverse direction.

The materials of the positive, electrolyte, and negative electrode layers are selected according to the voltage which is desired to be obtained across the battery and according to the desired application thereof. For example, certain batteries comprise a positive electrode made of lithium cobalt ($LiCoO_2$), other comprise a positive electrode based on titanium oxysulfide (TiOS), etc. Still as an example, the negative electrode may be made of lithium and the electrolyte may be of LiPON (lithium phosphorus oxynitride) type. As a variation, the negative electrode is formed by means of amorphous compounds and of lithium, for example, silicon or germanium and lithium, the amorphous material then becoming conductive under the influence of lithium during the battery operation.

As a specific example of embodiment, a LiPON battery with a positive $LiCoO_2$ electrode has a nominal 4.2-volt voltage and an operating range located between a few degrees and approximately 100° C.

Microbatteries are advantageously used due to their high miniaturization and to their high charge capacity relative to the occupied volume. When these microbatteries are rechargeable, their lifetime becomes much greater than that of their non-rechargeable equivalents, since hundreds or thousands or charge-recharge cycles can then be performed.

However, a progressive aging of these batteries can be observed, which translates as a progressive decrease in the charge capacity. Even in the case where a charged cattery is not used, that is, in the case of absence, there across, of a load into which it can supply current, a progressive discharge occurs, forcing to carry out a charge operation before use.

The inventors have observed that the aging phenomenon is all the faster as the ambient temperature to which the microbattery is submitted is high, be it in storage mode or in operation.

Figure 2:
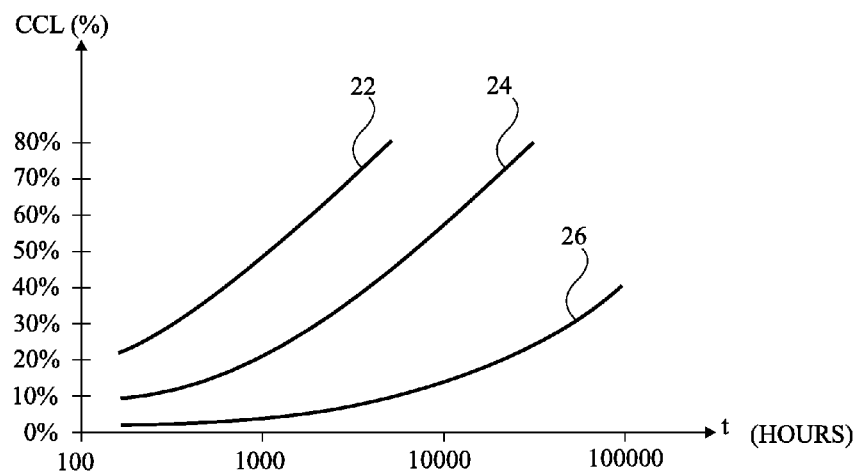
FIGS. 2 and 3 are curves illustrating an example of aging of stored microbatteries, according to the ambient temperature and to the initial charge conditions.

FIG. 2 shows typical aging curves of a lithium microbattery according to temperature, in storage mode, the microbattery being initially charged at 100% of its capacity. Time t in hours appears in abscissa according to a logarithmic scale, over a time period of approximately 10 years. The scale of ordinates shows the charge capacity loss percentage CCL of the battery as compared with a new state where the battery is assumed to have a 100% charge capacity.

The three curves of FIG. 2 respectively correspond to ambient temperatures of 80° C. (curve 22), of 60° C. (curve 24), and of 30° C. (curve 26). The variation of the charge capacity loss is of exponential type. For example, the curve at 60° C. shows a 30% charge capacity loss after 2,000 hours and a 70% loss after 20,000 hours.

Figure 3:
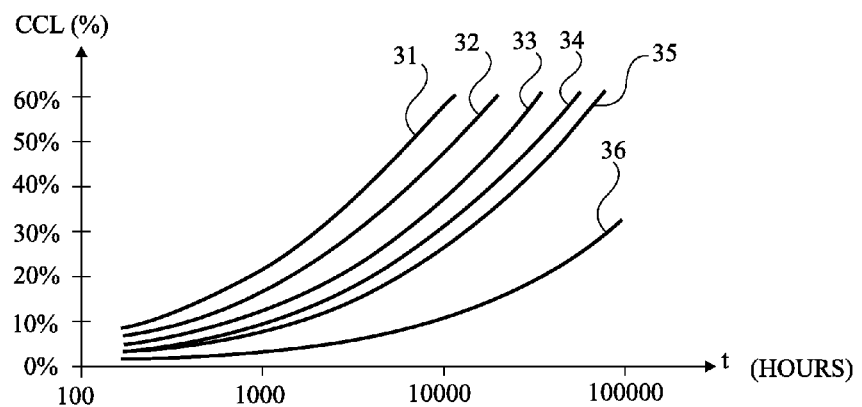

FIG. 3 shows typical curves of aging in storage of an initially charged lithium microbattery according to its storage time, for a 60° C. ambient temperature. As in FIG. 2, time t in hours appears in abscissa according to a logarithmic scale, over a time period of approximately 10 years, and the scale of ordinates shows charge capacity loss percentage CCL.

FIG. 3 illustrates six examples (six curves) 31 to 36, each corresponding to a different initial charge level, respectively 100% (curve 31), 90% (curve 32), 80% (curve 33), 72% (curve 34), 66% (curve 35), and 33% (curve 36). Here again, the variation of the charge capacity loss is of exponential type. For example, curve 34 for an initial 72% charge shows a charge capacity loss of approximately 10% after 1,500 hours of storage, of approximately 30% after 10,000 hours, and of approximately 60% after 50,000 hours. The lower the initial charge level, the lower the charge capacity loss. For example, the charge capacity loss after approximately 10,000 hours of storage is 10% for an initial charge of 33% of the full charge capacity, of 25% for an initial 66% charge, and of close to 60% for an initial 100% charge.

These observations show that the aging of this type of microbattery is all the faster as the temperature to which the microbattery is submitted is high.

They also illustrate the problem of the possible aging of microbatteries in storage. A battery, even new, may have a short lifetime if it has been stored charged for a long time.

The inventors have observed that the charge capacity of this type of microbattery may be partially preserved after a microbattery discharge operation, and this more or less rapidly and more or less efficiently according to the discharge conditions (current-vs.-voltage curve imposed by the discharge means) and to the environmental conditions (ambient temperature).

According to a first aspect, the inventors have also observed that a partial regeneration of the structure of the negative electrode-electrolyte-positive electrode layers of this type of microbattery is made possible by applying thereto a low forward bias voltage for a relatively long time, for example, from a few hours to a few tens of hours, while the battery is discharged. This method enables to recover a significant charge capacity, on the order of 50% of the charge capacity lost between the time when the battery was completely charged and the time when it has discharged.

Complex electrochemical phenomena are involved. The inventors assume that this method enables to act on the crystal structure of the positive electrode.

Figure 4:
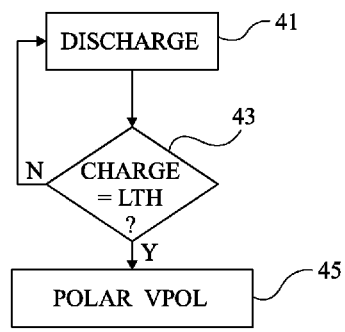
FIG. 4 very schematically shows an embodiment of a method for regenerating the charge capacity of a microbattery according to a first aspect.

FIG. 4 very schematically shows, in the form of blocks, an embodiment of a method for regenerating the charge capacity of a microbattery. A first step 41 (DISCHARGE) is a battery discharge operation. During this discharge operation, the battery charge level is periodically measured and compared (block 43, CHARGE=LTH?) with a minimum charge threshold LTH. As long as this threshold has not been reached (output N of block 43), the discharge operation is continued. As soon as threshold LTH is reached (output Y of block 43), a step 45 (POLAR VPOL) of forward biasing of the battery under a low voltage VPOL is carried out.

The actual discharge operation is performed by any appropriate mechanism. For example, the discharge current is controlled for a first portion of the step, after which the discharge voltage is controlled for the rest of the step. Such a discharge operation is performed until the battery has a residual charge level LTH lower than 20%, preferably lower than 10%, or even than 5%, of the nominal charge level, measured when the battery is new. "Nominal charge" means the maximum charge of the battery, in environmental conditions corresponding to the operation conditions of use specified for the battery.

The threshold (LTH) is for example experimentally determined according to the charge capacity which is desired to be recovered and to the durations of discharge step 41 and of biasing step 45, selected according to the system powered by the battery. Many solutions for testing the residual charge level of a battery during the discharge step are known. For example, the battery is made to supply current to a calibrated load and the charge current and voltage parameters are measured.

Battery biasing step 45 comprises imposing across the battery a forward voltage VPOL, which is low as compared with its nominal operating voltage. For example, in the case of an all-solid-state thin-film lithium battery having a 4.2-volt nominal voltage, voltage VPOL is selected to be between 2 and 3.6 volts. More generally, voltage VPOL corresponds to less than 85%, preferably less than 50% of the nominal voltage. To avoid damaging the battery, this voltage however preferably remains greater than 45% of the nominal voltage.

The duration of the biasing step depends on the characteristics of the battery and on the ambient temperature conditions. This duration is for example a few tens of hours. In practice, this duration is adapted to the time necessary for the regeneration and is typically determined experimentally.

A quantity on the order of 50% of the charge capacity lost during the regeneration operation, in the case where the battery was fully charged at the beginning of this operating period and discharged at the end of this same period, can thus be recovered.

Figure 5:
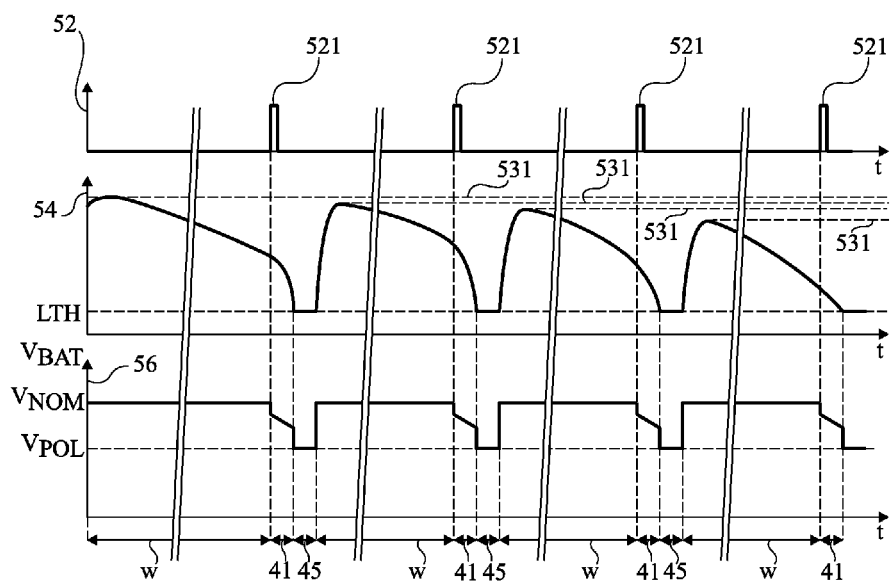
FIG. 5 illustrates, in the form of timing diagrams, the operation of the method of FIG. 4.

FIG. 5 shows timing diagrams illustrating the regeneration method and its microbattery charge-discharge-biasing cycles. A first timing diagram 52 shows the times at which the discharge is triggered, in the form of start pulses 521. A second timing diagram 54 shows the course of the microbattery charge. A third timing diagram 56 shows the course of voltage VBAT across the battery.

Four cycles are shown in FIG. 5, where it should be noted that the battery capacity at full charge 531 decreases along time, this being due to the fact that the regeneration is not complete. Each cycle is comprised of the three following steps: operating step W capable of containing an initial charge operation, forced discharge step 41 down to level LTH, and step 45 of biasing under low voltage VPOL for which the charge level remains substantially steady. Voltage VBAT is nominal (value VNOM) during operating step W, progressively decreases during discharge step 41, and corresponds to imposed value VPOL during the biasing step. The course of the voltage during discharge step 41 may vary according to the discharge process used.

Start pulses 521 may be conditioned by different types of events, and by the operational conditions of the system powered by the battery. For example, the exceeding of an ambient temperature threshold triggers the discharge operation. According to another example, the discharge process is triggered after a determined operating time. It is also possible to periodically test the charge level during the battery operation and to trigger the discharge operation when the charge level decreases below a threshold. Other triggering conditions or even a combination of different conditions may also be envisaged.

According to the characteristics of the battery, and to the desired operating mode, especially to take into account the requirements of the system powered by the battery in terms of availability thereof, bias voltage VPOL may be settable.

In many cases, systems using microbatteries are monitoring or control systems which need to have an availability and reliability guaranteed for a long period. Since the microbattery regeneration process is not complete, the battery aging is strongly decreased, but not totally suppressed.

It would be desirable to detect the battery aging level to be able to intervene on the system using it, or to determine whether a stored battery is capable of being inserted into a system or, for example, to replace the battery when its charge capacity decreases below a given threshold.

Figure 6:
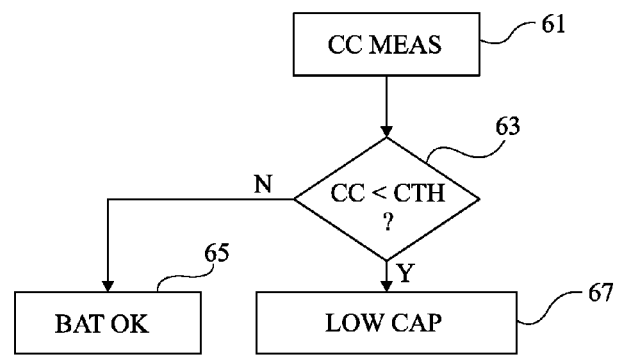
FIG. 6 very schematically shows an embodiment of a method for controlling the charge capacity of a microbattery according to the first aspect.

FIG. 6 very schematically shows, in the form of blocks, an embodiment of a method for controlling the charge capacity of a microbattery. A first step 61 (CC MEAS) comprises measuring the battery charge capacity. Then (test 63, CC<CTH?) charge capacity CC is compared with a threshold CTH. As long as the charge capacity remains greater than this threshold (output N of block 63), the aging is considered not to be critical (block 65, BAT OK). As soon as threshold CTH is reached (output Y of block 63), a signal corresponding to the detection of a low charge capacity is generated (block 67, LOW CAP). This signal may be used in different ways, for example, to report the need to replace the battery.

Measurement step 61 for example comprises measuring the time necessary for a discharge into a calibrated load from a known initial charge state. Threshold CTH is set, for example, to 10% of the initial charge capacity of the battery when new, preferably to 5%. Other thresholds may be selected according to the accuracy of the measurement, to the criticality of the availability of the system using the battery, or on other criteria associated with the application, such as the delay necessary to replace the battery.

According to an embodiment, the method of FIG. 6 is implemented periodically. The periodicity may for example be of one measurement after each operation of discharge and biasing of the method of FIG. 4. As a variation, the measurement of the charge capacity may be measured cyclically, for example, every 100 hours. According to another variation, the measurement is performed during periods when the battery is not necessary for the system operation (case, for example, of a system having a back-up battery or another power supply means).

The above-described embodiments can be implemented when the battery is in place in an electronic system that is it likely to power.

As a variation, such solutions may be applied to a battery in storage, in the form of periodic maintenance operations. For example, an electronic control device may be provided in the form of a test package of battery charger type.

Figure 7:
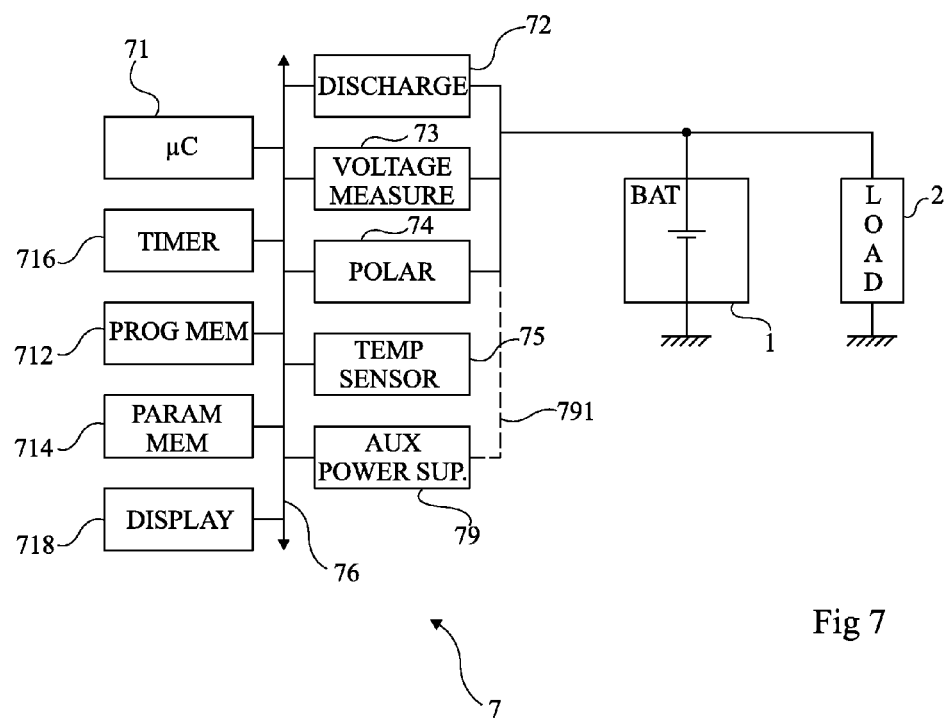
FIG. 7 shows an embodiment of an electronic system for controlling a microbattery.

FIG. 7 very schematically shows, in the form of functional blocks, an example of an electronic system 7 for controlling a microbattery. Many variations of such a system can exist. Only those elements which are most representative of a control device especially allowing steps of discharge and biasing of a microbattery have been illustrated.

Microbattery 1 (BAT) is connected to a load 2 (LOAD) that it powers. Control system 7 is driven by a microcontroller 71 (µC) having resources usual for this type of device added thereto, for example, a program memory 712 (PROG MEM) and a parameter memory 714 (PARAM MEM), and a clock mechanism 716 (TIMER). A unit 718 (DISPLAY) indicative of the battery state may be added thereto. Parameter memory 714 especially enables to store the parameters used in the implementation of methods for regenerating the battery charge capacity. In particular, according to an embodiment, the different thresholds and threshold levels are programmable. Different units of sensor or actuator type enable to perform the operation (block 72, DISCHARGE) of discharge of battery 1, to measure (unit 73, VOLTAGE MEASURE) the voltage there across, to force a bias voltage (unit 74, POLAR) there across, or also to measure the ambient temperature (unit 75, TEMP SENSOR). The different units communicate and are connected to one or several control and data exchange buses 76.

For its operation, control device 7 itself requires being powered by a power source. For example, device 7 is connected to a main electric power source such as the mains and microbattery 1 ensures secondary functions. According to another example, the system is capable, according to its environmental conditions, of sampling all or part of its operating power from its environment by conversion of thermal, mechanical, electromagnetic power, etc.

Device 7 may be a sub-system implanted within an electronic unit powered by battery 1, or may be a self-contained device used to test and to regenerate batteries encapsulated in a package, for example, in the form of button cells.

According to an alternative embodiment, an auxiliary power supply device 79 (AUX POWER SUP) comprising an auxiliary battery coupled (connection 791 in dotted lines) to battery 1 is used. The auxiliary battery charge operation is performed by battery 1 when operating.

Figure 8:
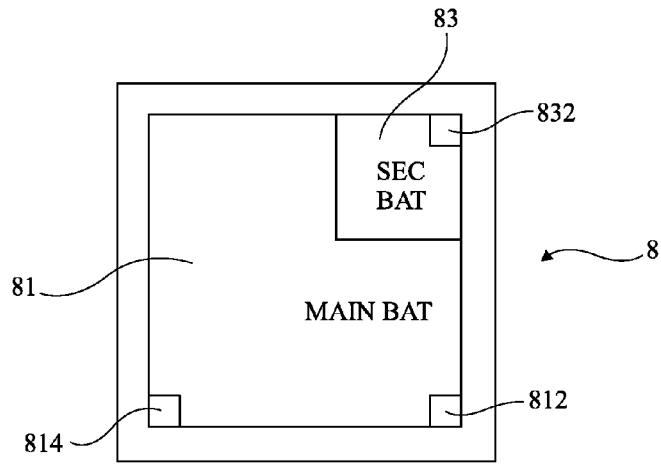
FIG. 8 shows an embodiment of a device with a main and a secondary microbattery.

FIG. 8 is a top view of an example of device 8 formed of a main microbattery 81 (MAIN BAT) and of a secondary microbattery 83 (SEC BAT) placed on the main battery. Batteries 81 and 83 are preferably formed on a common substrate. FIG. 8 shows positive electrodes 812 of the main battery and 832 of the secondary battery, as well as negative electrode 814 common to the two batteries.

Battery 83 may be substituted to battery 81 when the latter undergoes a discharge and biasing operation according to one of the previously-described methods. Battery 83 can thus temporarily power a system using battery 81 and thus avoid any operating loss. Such a combination has many advantages, especially in terms of bulk, of manufacturing cost, of simplification of the control electronics.

Preferably, secondary battery 83 is itself submitted to a discharge and biasing process, or even to a process of measurement of the charge capacity, such as described hereabove.

Figure 9:
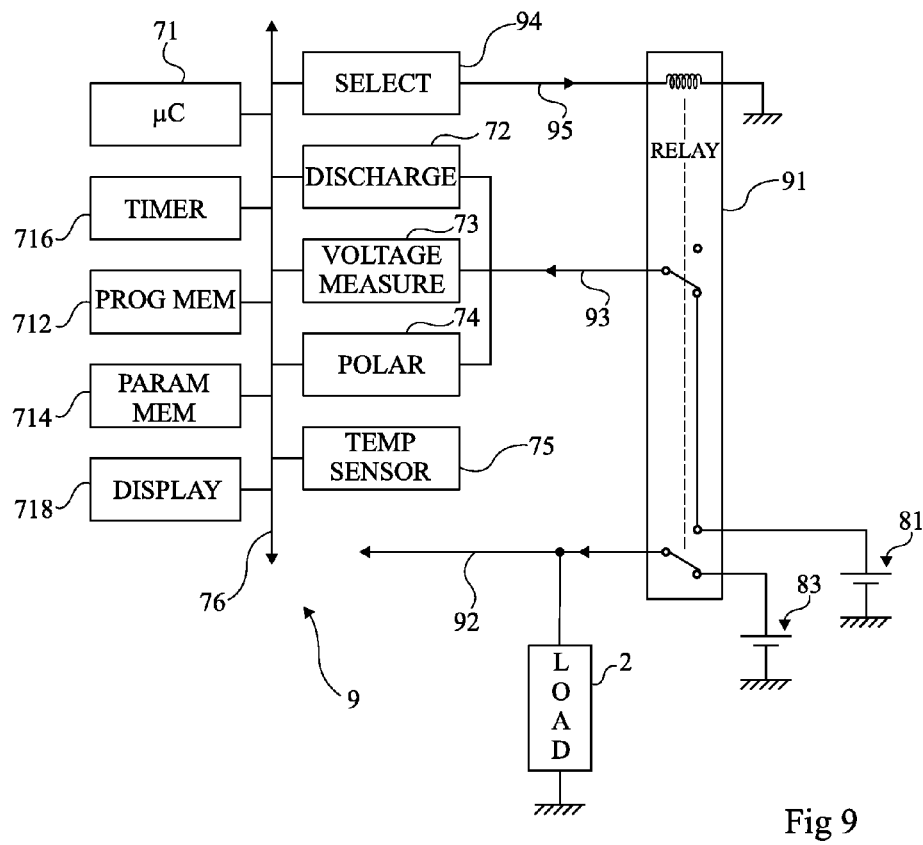
FIG. 9 is a variation of FIG. 7, capable of using the system of two microbatteries shown in FIG. 8.

FIG. 9 very schematically shows in the form of functional blocks an example of electronic device 9 using a main microbattery 81 and a secondary microbattery 83, for example, of the type illustrated in FIG. 8. As a variation, the microbatteries are separated.

Device 9 shows the elements of the system of FIG. 7. For example, batteries 81 and 83 are connected via a relay 91 (RELAY) or the like to load 2, so that a single one of the two batteries is connected thereto (connection 92) at a given time to power the load, the other microbattery being then connected (connection 93) to control device 9. Device 9 has a unit 94 (SELECT) connected (connection 95) to the coil of relay 91 that it controls under control of microcontroller 71.

In this example, control device 9 is itself powered by that of the two batteries which powers load 2, which avoids providing an auxiliary battery.

As for the embodiment of FIG. 7, system 9 may further be connected to a main electric power source such as the mains, it may be capable, according to the environmental conditions, to sample or part of its operating power from its environment, by conversion of thermal, mechanical, electromagnetic power, etc.

According to a second aspect, the aging being faster in operating mode (battery supplying a load) and at higher temperature, it may be appropriate to monitor the ambient temperature and to cause a discharge when the temperature exceeds a threshold. As a specific example, this threshold is approximately 60° C. in the case of a LiPON electrolyte micro-battery.

Figure 10:
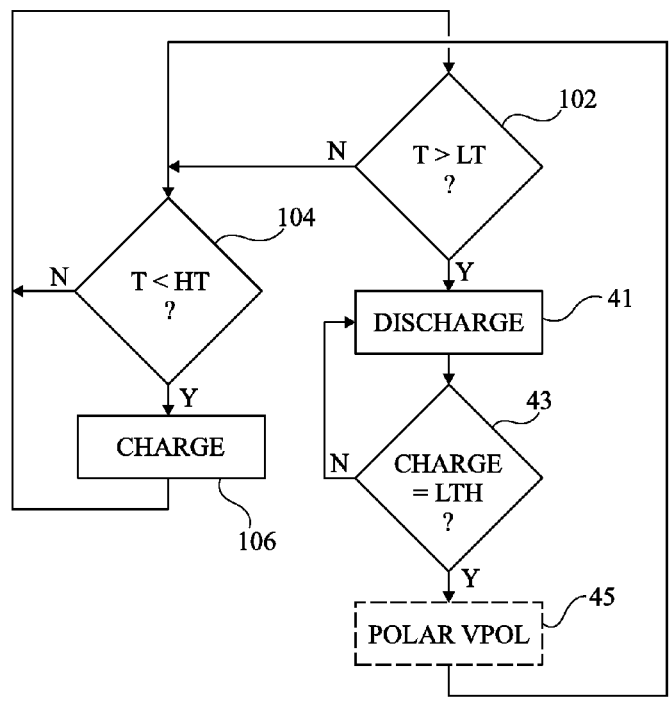
FIG. 10 very schematically shows an embodiment of a method for managing the lifetime of a microbattery according to a second aspect.

FIG. 10 shows, in the form of blocks, an embodiment of a regeneration method taking into account this second aspect, that is, a cyclic method of the type charging-discharging a microbattery according to the ambient temperature.

Figure 11:
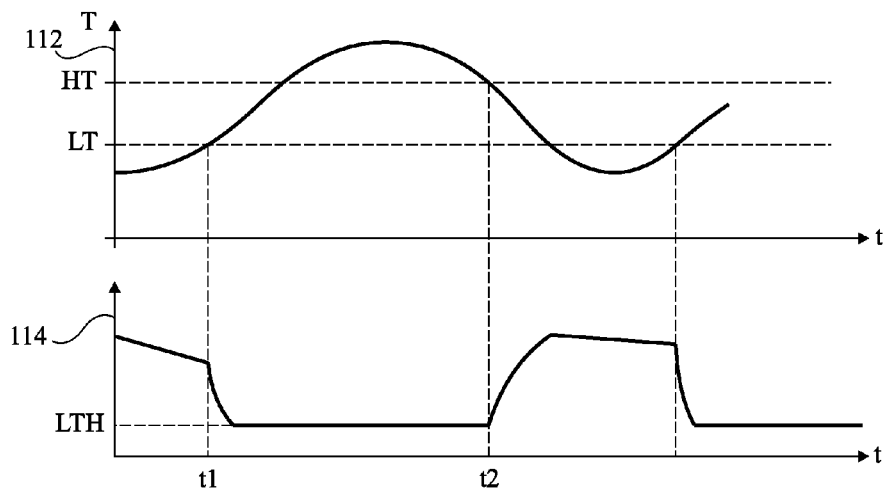
FIG. 11 illustrates, in the form of timing diagrams, the operation of the method of FIG. 10.

FIG. 11 illustrates, in timing diagrams, an example of implementation of this embodiment. A first timing diagram 112 shows the variations of temperature T. A second timing diagram 114 shows the variation of the battery charge.

According to this embodiment, it is provided to monitor the ambient temperature with respect to two thresholds, respectively high, HT, and low, LT. For example, the temperature is compared with the low threshold (block 102, T>LT?). When the temperature increases and reaches (output Y of block 102; time t1, FIG. 11) threshold LT, discharge 41 of the battery is triggered. For example, the discharge carries on until a minimum threshold is reached (output Y of block 43), for example, threshold LTH described in relation with FIG. 5. Preferably, the discharge operation is followed by a biasing operation such as described in relation with FIG. 5 (block 45 in dotted lines in FIG. 10).

The temperature decrease is then monitored by comparing it with the high threshold (block 104, T<HT?). When the temperature falls back below threshold HT (output Y of block 104; time t2, FIG. 11), the battery is then set back to the charge mode (block 106) until it reaches its maximum charge capacity.

Although this has not been shown in FIG. 10, if the temperature remains between the two thresholds for a given time period, a new discharge is triggered. The time period is for example set between a few hours and 20-30 hours, for example, on the order of 12 hours. Further, if during a temperature decrease, the temperature does not decrease back below threshold LT, and increases beyond threshold HT, a discharge step is also triggered.

While the battery is being discharged, it has to be replaced with another power source to power the system (load 2) to which it is connected and that it is supposed to power. This power supply means for example is a system for converting thermal power into electric power, of Seebeck converter type. Such an embodiment takes advantage of the fact that the battery discharge is triggered when the ambient temperature is high, and thus when the Seebeck converter can operate. Any other replacement power supply mode may also be envisaged depending on the characteristics of the system using the battery.

Threshold HT for starting the charge is preferably selected to be greater than threshold LT for starting a discharge, in order to take into account thermal inertia phenomena and to leave time for the battery to recharge before it becomes necessary for the system power supply (case of a replacement source of Seebeck converter type, for example). As a specific embodiment, thresholds LT and HT are respectively approximately 47° C. and 61° C.

The above operation is repeated along the battery lifetime.

Different embodiments with different variations have been described hereabove. It should be noted that those skilled in the art may combine various elements of these various embodiments and variations without showing any inventive step. Further, the practical implementation of the described embodiments is within the abilities of those skilled in the art based on the functional indications given hereabove and by using tools usual per se.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method for regenerating charge capacity of a battery, the method comprising:
    discharging the battery using a discharge circuit;
    detecting that a charge level of the battery is below a first and threshold, comprising:
        measuring the charge level of the battery; and
        comparing the measured charge level to the first threshold; and
    after the detecting, applying a bias voltage across the battery using a bias circuit, the bias voltage being smaller than a minimum voltage necessary to charge the battery.

2. The method of claim 1, wherein the bias voltage has a value that is 30% to 50% of the minimum voltage necessary to charge the battery.

3. The method of claim 1, wherein discharging the battery reduces the charge level of the battery.

4. The method of claim 3, wherein the first threshold corresponds to less than 20% of a nominal charge of the battery when new.

5. The method of claim 4, wherein the first threshold corresponds about 5% of the nominal charge of the battery when new.

6. The method of claim 3, wherein the first threshold is programmable.

7. The method of claim 1, wherein the first threshold corresponds to less than 10% of a nominal charge of the battery when new.

8. The method of claim 7, wherein the first threshold corresponds about 5% of the nominal charge of the battery when new.

9. The method of claim 1, wherein the first threshold is programmable.

10. The method of claim 1, wherein discharging the battery comprises discharging the battery when an ambient temperature exceeds a second threshold.

11. The method of claim 10, wherein the second threshold is programmable.

12. The method of claim 1, wherein the battery comprises an all-solid-state thin-film lithium type battery.

13. The method of claim 1, wherein the steps of discharging the battery and applying the bias voltage across the battery are implemented during operation of the battery.

14. The method of claim 1, wherein the steps of discharging the battery and applying the bias voltage across the battery are implemented during storage of the battery.

15. The method of claim 1, wherein the bias voltage is programmable.

16. A method comprising:
    using a main battery to provide power to a load;
    regenerating a charge capacity of the main battery by causing the main battery to discharge and, after causing the main battery to discharge, applying a bias voltage across the main battery, the bias voltage being smaller than a minimum voltage necessary to charge the main battery; and
    using a secondary battery different from the main battery to provide power to the load while regenerating the charge capacity of the main battery.

17. The method of claim 16, wherein the main battery and the secondary battery are disposed on a common substrate.

18. The method of claim 16, further comprising:
    causing the secondary battery to discharge; and
    after causing the secondary battery to discharge, applying a second bias voltage across the secondary battery, the second bias voltage being smaller than a minimum voltage necessary to charge the secondary battery.

19. A device operable with a battery, the device comprising:
    a discharge circuit configured to cause the battery to discharge;
    a measurement circuit configured to measure a charge level of the battery and to compare the measured charge level with a first threshold; and
    a bias circuit configured to apply a bias voltage across the battery such that during application of the bias voltage, a voltage of the battery is the same as the bias voltage, the bias voltage being smaller than a minimum voltage necessary to charge the battery.

20. The device of claim 19, further comprising:
    a microcontroller configured to control at least the discharge circuit and the bias circuit;
    program memory coupled to the microcontroller;
    parameter memory coupled to the microcontroller; and
    a clock mechanism coupled to the microcontroller.

21. A device operable with a battery, the device comprising:
    a discharge circuit configured to cause the battery to discharge;
    a bias circuit configured to apply a bias voltage across the battery, the bias voltage being smaller than a minimum voltage necessary to charge the battery;
    a microcontroller configured to control the discharge circuit and the bias circuit;
    program memory coupled to the microcontroller;

parameter memory coupled to the microcontroller; and a clock mechanism coupled to the microcontroller.

22. The device of claim 21, further comprising a sensor or measurement unit coupled to the microcontroller.

23. The device of claim 22, wherein the sensor or measurement unit comprises a temperature unit.

24. The device of claim 22, wherein the sensor or measurement unit comprises a voltage unit.

25. The device of claim 22, wherein the microcontroller is configured to control the discharge circuit and the bias circuit based on physical information received from the sensor or measurement unit and threshold information stored in the parameter memory.

26. The device of claim 21, wherein the bias circuit is configured to apply the bias voltage across the battery such that during application of the bias voltage, a voltage of the battery is the same as the bias voltage.

* * * * *